F. A. HINE.
Culinary-Steamer.

No. 128,396.                                    Patented June 25, 1872.

Witness.
Geo. W. Tibbitts
H. W. Adams

Inventor,
Frank A. Hine 128,396

UNITED STATES PATENT OFFICE.

FRANK A. HINE, OF CLEVELAND, OHIO, ASSIGNOR OF ONE-HALF HIS RIGHT TO JOHN A. WORLEY, OF SAME PLACE.

IMPROVEMENT IN CULINARY STEAMERS.

Specification forming part of Letters Patent No. 128,396, dated June 25, 1872.

Specification describing an Improvement in the Combination of a Vegetable-Steamer with a Tea-Kettle, invented by FRANK A. HINE, of Cleveland, in the county of Cuyahoga and State of Ohio.

This invention relates to the construction and arrangement of a steamer for cooking vegetables and a tea-kettle in such a manner that the steamer may be set on the kettle and receive the steam therefrom; the water in said kettle being also used for making tea, coffee, and such other purposes for which hot water is required; the object being to utilize the steam generated in the kettle, which in the ordinary use is allowed to escape. This improvement is applicable to all common cook or heating stoves.

Figure 1:
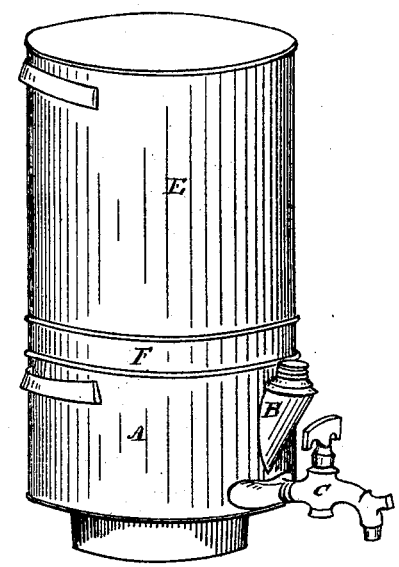
Figure 2:
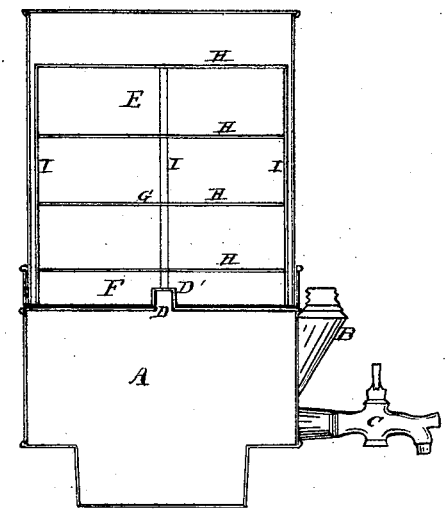

The following is a description of its construction and operation:

Referring to the drawing, Figure 1 is an exterior view, and Fig. 2 is a vertical half section of my above-mentioned improvement.

A represents a circular vessel, made in the form of a tea-kettle, having a tight flat top, and is provided with a pit for setting in a hole on the stove. At one side, near the top, is attached a filling-pipe, B, and below, near the rim of the pit, is attached a faucet, C, for the double purpose of indicating the height of the water in the kettle and for drawing off water. In the top of the kettle, either in the center or at one side, is a small pipe, D, intended for conducting the steam generated in the kettle to an upper compartment or vessel. E is a steamer, which consists of a metal can, having a flat top and without a bottom, which sits in the rim of a base, F, that sits on the kettle. Said base has a pipe, D', fitting over the pipe D. To the base F is also attached a rack, G, for holding pans for containing vegetables or other articles of food to be cooked. The rack consists of a series of flat bars, H H, crossing at the center and secured together, the ends, except at one side, being attached to upright posts I I, giving the rack strength to support the pans.

The steamer may be made by inverting the can E, and having a cover, the rack being loose and slipped down in; but the plan shown is preferable, as no steam can escape at the top, and the base-pan F catches all the condensed steam. The steamer E may have a small pipe at the top so that a second steamer may be placed on it, and thus increase the capacity of the invention.

Having described my invention, I claim—

The kettle A, provided with a filling-pipe, B, and faucet C, and the steamer E, base F, rack G, and steam-induction pipe D, when the same are constructed, combined, arranged, and operating substantially as shown and described, and for the purpose set forth.

FRANK A. HINE.

Witnesses:
GEO. W. TIBBITTS,
H. W. ADAMS.